US009785957B2

(12) United States Patent
McCormack et al.

(10) Patent No.: US 9,785,957 B2
(45) Date of Patent: *Oct. 10, 2017

(54) COLLECTING AND PRESENTING INFORMATION

(71) Applicant: MICROSOFT TECHNOLOGY LICENSING, LLC, Redmond, WA (US)

(72) Inventors: Michael J. McCormack, Snohomish, WA (US); Vineet Gupta, Kirkland, WA (US); Ron Mondri, Bellevue, WA (US); Christian Heydemann, Kirkland, WA (US); Praveen Upadhyay, Bellevue, WA (US); Nicholas James Thomson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,214

(22) Filed: Dec. 15, 2014

(65) Prior Publication Data

US 2015/0170165 A1 Jun. 18, 2015

Related U.S. Application Data

(63) Continuation of application No. 12/894,186, filed on Sep. 30, 2010, now Pat. No. 8,918,421.

(51) Int. Cl.
G06F 15/16 (2006.01)
G06Q 30/02 (2012.01)
(Continued)

(52) U.S. Cl.
CPC ... *G06Q 30/0201* (2013.01); *G06F 17/30342* (2013.01); *G06Q 10/0637* (2013.01); *G06Q 30/01* (2013.01); *H04L 51/00* (2013.01)

(58) Field of Classification Search
CPC .............................. G06Q 30/01; H04L 12/58
(Continued)

(56) References Cited

U.S. PATENT DOCUMENTS 7,660,587 B2 * 2/2010 Nurminen ............. H04M 7/003
 379/221.11
7,788,120 B2 * 8/2010 Mathias ............. G06Q 10/0633
 705/7.27

(Continued)

OTHER PUBLICATIONS

'Synchronizing a Local Data Store with Microsoft Outlook'; Jan. 2006; pp. 11.*

(Continued)

*Primary Examiner* — Glenford Madamba
(74) *Attorney, Agent, or Firm* — Scott Y. Shigeta; Newport IP, LLC

(57) ABSTRACT

Concepts and technologies are described herein for collecting and displaying information. A client device executes one or more application programs for providing operations with respect to entity-related data that relates to one or more entities. The application programs analyze the entity-related data to identify one or more entities associated with the entity-related data and transmit entity information relating to the entities to a server or database. Information relating to the entity is retrieved from the server or database and is presented to a user of the client device.

20 Claims, 10 Drawing Sheets

(51) Int. Cl.
- G06Q 30/00 (2012.01)
- G06Q 10/06 (2012.01)
- G06F 17/30 (2006.01)
- H04L 12/58 (2006.01)

(58) Field of Classification Search
USPC .......................................................... 709/203
See application file for complete search history.

(56) References Cited

U.S. PATENT DOCUMENTS

| | | |
|---|---|---|
| 2003/0110256 A1 | 6/2003 | Yoon et al. |
| 2003/0191832 A1 | 10/2003 | Satyavolu et al. |
| 2003/0212654 A1 | 11/2003 | Harper et al. |
| 2004/0093343 A1 | 5/2004 | Lucas et al. |
| 2006/0212299 A1 | 9/2006 | Law |
| 2007/0168367 A1 | 7/2007 | Dickinson et al. |
| 2007/0192162 A1 | 8/2007 | Simons et al. |
| 2007/0225992 A1 | 9/2007 | Palmieri et al. |
| 2008/0005021 A1 | 1/2008 | Brown et al. |
| 2012/0072436 A1* | 3/2012 | Pierre .................. G06Q 30/00 707/758 |
| 2012/0084340 A1 | 4/2012 | McCormack et al. |

OTHER PUBLICATIONS

Vitt et al; 'Data Integration Solutions for Master Data Management'; Mar. 2006; pp. 6.*

Translated a Chinese Official Action dated Oct. 8, 2013 in Chinese Application No. 201110306431.7, a counterpart foreign application os U.S. Appl. No. 12/894, 186, 10 pages.

Translated a Chinese Official Action dated Feb. 21, 2013 in Chinese Application No. 20110306431.7, a counterpart foreign application of U.S. Appl. 12/894,186, 10 pages.

Translated a Chinese Official Action dated Apr. 23, 2014, in Chinese Application No. 201110306431.7, a counterpart foreign application of U.S. Appl. No. 12/894,186, 10 pages.

"Office Action Issued for European Patent Application No. 11831118.2", a counterpart foreign application of U.S. Appl. No. 12/894,186, Mailed Date: Feb. 25, 2015, 6 Pages.

"Extended European Search Report Received for European Patent Application No. 11831118.2", a counterpart foreign application for U.S. Appl. No. 12/894,186 Mailed Date: May 14, 2014, 5 Pages.

"Identifying and Accessing Reports in Microsoft CRM", Retrieved at <<http://www.dummies.com/how-to/content/identifying-and-accessing-reports-in-microsoft-crm.html>>, Apr. 20, 2010, pp. 3.

International Search Report, Mailed date: Feb. 9, 2012, Application No. PCT/US2011/048509, filed date: Aug. 19, 2011, pp. 8.

"Non-Final Office Action received for U.S. Appl. No. 12/894,186", Mailed Date: Jan. 7, 2013, 29 Pages.

"Final Office Action received for U.S. Appl. No. 12/894,186", Mailed Date: Sep. 10, 2013, 35 Pages.

"Privacy Policy", Retrieved at << http://www.customers121.com/privacy.htm >>, May 4, 2008, pp. 6.

"Synchronizing a Local Data Store with Microsoft Outlook", Retrieved at << http://msdn.microsoft.com/en-us/library/aa479346.aspx >>, Jan. 2006, pp. 11.

Vitt, Elizabeth, "Data Integration Solutions for Master Data Management", Retrieved at << http://msdn.microsoft.com/en-us/library/aa964123%28SQL.90%29.aspx >>, Mar. 2006, pp. 6.

* cited by examiner

FIG. 3G

COLLECTING AND PRESENTING INFORMATION

CROSS-REFERENCE TO RELATED APPLICATION

This application is a continuation of, and claims priority to, commonly owned, U.S. Pat. No. 8,918,421, issued on Dec. 23, 2014, from U.S. application Ser. No. 12/894,186 filed Sep. 30, 2010, and entitled "Collecting and Presenting Information," which is herein incorporated by reference in its entirety.

BACKGROUND

Customer relationship management ("CRM") software has become a popular tool for tracking and managing company activities, and for tracking and managing business opportunities with customers. Some CRM platforms on the market today include databases, servers, and/or other devices configured to organize, track, synchronize, and automate various business activities such as marketing efforts, contact management, sales force information and management, customer service, and the like.

CRM platforms are passive with regard to providing data to users. Thus, users of CRM systems typically must have a clear understanding of the types of data stored and managed by the CRM systems, as well as a clear understanding of how the data is organized, in order to make use of the data. As such, many CRM systems provide the stored and/or managed data only in response to carefully tailored requests or queries, and therefore only at the request of a trained programmer, operator, or other business entity, and/or upon receiving a query or request generated by tailored devices and/or software.

As such, many users of CRM systems are unable to obtain information desired or needed when the information would be of the most value without separately accessing a CRM system. Thus, while CRM systems may be effective and valuable tools for sales, marketing, customer relations, and other business needs, these tools may be underutilized by businesses. The data stored or hosted by CRM systems may be more valuable to many businesses if the data was properly provided when the data is needed most.

It is with respect to these and other considerations that the disclosure made herein is presented.

SUMMARY

Concepts and technologies are described herein for collecting and displaying information. In accordance with the concepts and technologies disclosed herein, a client device receives or generates entity-related data during execution of one or more application programs at the client device. The client device collects information relevant to the entity-related data using on-demand and/or offline or cached operations. The client device presents the collected or cached information to a user of the client device when the information is relevant to functionality provided at the client device. The information is formatted according to the content of the information, as well as the context of other operations occurring at the client device, to present the information in a useful and compelling manner at the point of need. The information can provide immediate context for other operations occurring at the client device.

According to one aspect, a client device executes application programs and an insight application for providing the functionality described herein. The application programs provide various functions such as electronic mail ("email") messaging, calendaring, web browsing, contact management, and the like. The application programs generate, receive, or send entity-related data that relates to one or more entities. As used herein, the word "entity," and variants thereof, is used expansively to refer to a person, a company, a product, a work group, a team, a business unit, a topic, and/or subject matter. The insight application is executed by the client device to analyze the entity-related data to identify one or more entities associated with the entity-related data. The one or more entities can be indicated by entity information determined by the insight application, determined by the application programs, and/or extracted from the entity-related data by the insight application.

According to another aspect, the client device is configured to disambiguate the entity information if more than one entity is consistent with the entity information. This disambiguation can be provided by analysis of contact information stored at the client device, and/or by accessing a CRM server or another device that operates in communication with the client device. According to various embodiments, the disambiguation can be automatically and/or selectively performed. The client device transmits the disambiguated entity information to the CRM server.

According to another aspect, the CRM server is configured to execute a server application to receive the disambiguated entity information, to access CRM data stored at the CRM server and/or at one or more data storage locations in communication with the CRM server, to identify entity data associated with the entity information, and to transmit the entity data to the client device. The insight application analyzes the entity data, as well as contextual information based upon the entity-related data, to identify related entities and/or a context for presentation of the entity data.

If appropriate, the insight application obtains data relating to the related entities and receives entity data corresponding to the related entities from the CRM server. The insight application formats the entity data associated with the entities and the related entities based upon the context of the entity-related data, and presents the entity data to the user.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3G are user interface diagrams showing aspects of exemplary user interfaces for presenting information at a client device, according to various embodiments.

DETAILED DESCRIPTION

Figure 1:
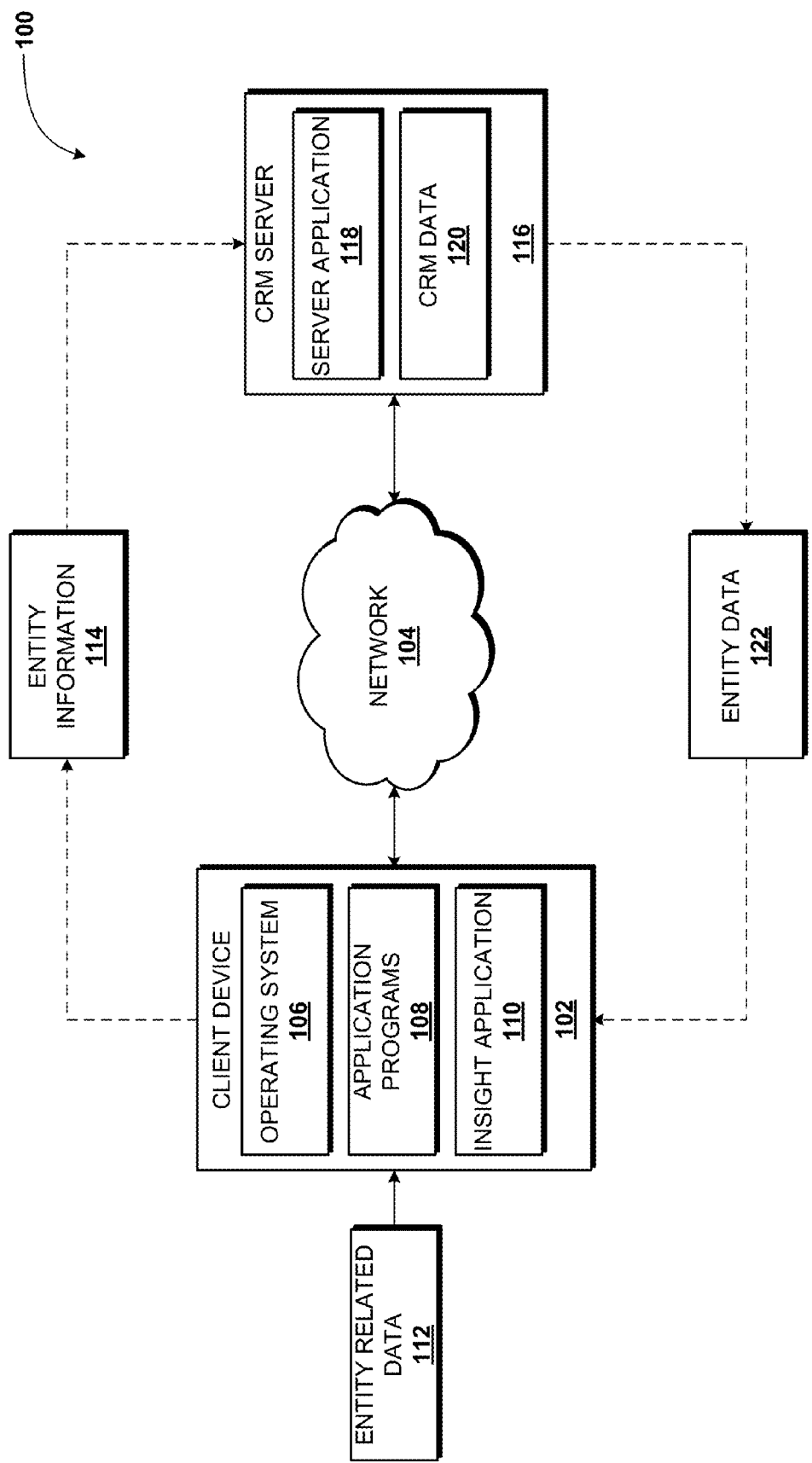
FIG. 1 is a system diagram illustrating an exemplary operating environment for the various embodiments disclosed herein.

Concepts and technologies are described herein for collecting and displaying information. In accordance with the concepts and technologies disclosed herein, a client device executes application programs and an insight application for providing the functionality described herein. The application programs provide various functions such as electronic mail ("email") messaging, calendaring, web browsing, contact management, and the like. The application programs generate, receive, or send entity-related data that relates to one or more entities. The insight application is executed by the client device to analyze the entity-related data to identify one or more entities associated with the entity-related data. The entity associated with the entity-related data can be indicated by entity information extracted from the entity-related data, determined by the application programs, and/or determined by the insight application.

In some embodiments, the client device is configured to disambiguate the entity information if more than one entity is consistent with the entity information. This disambiguation can be provided by analysis of contact information stored at the client device, and/or via accessing a CRM server or another device or node that operates in communication with the client device. The client device transmits the disambiguated entity information to the CRM server. The CRM server is configured to execute a server application. The CRM server receives the disambiguated entity information, accesses CRM data stored at the CRM server and/or at one or more data storage locations in communication with the CRM server, identifies entity data associated with the entity information, and transmits the entity data to the client device. The insight application analyzes the entity data, as well as contextual information based upon the entity-related data, to identify related entities and/or a context for presentation of the entity data.

The insight application obtains data relating to the related entities and receives entity data corresponding to the related entities from the CRM server, if appropriate in view of the entity data and/or the determined context. The insight application formats the entity data associated with the entities and the related entities based upon the context of the entity-related data, and presents the entity data to the user.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for collecting and presenting information will be presented.

Referring now to FIG. 1, aspects of one operating environment 100 for the various embodiments presented herein will be described. The operating environment 100 shown in FIG. 1 includes a client device 102 operating on or in communication with a network 104. According to various embodiments, the client device 102 is a personal computer ("PC") such as a desktop, tablet, or laptop computer system. The client device 102 may include other types of computing systems including, but not limited to, server computers, handheld computers, netbook computers, embedded computer systems, personal digital assistants, mobile telephones, smart phones, or other computing devices. The client device 102 is configured to execute an operating system 106, one or more application programs 108, and an insight application 110.

The operating system 106 is a computer program for controlling the operation of the client device 102. The application programs 108 are executable programs configured to execute on top of the operating system 106 to provide various functionality as described herein. According to various implementations, the application programs 108 include one or more web browser applications, messaging applications, communication applications, calendaring applications, contact management applications, and/or other applications and programs. The insight application 110 is an executable program configured to execute on top of the operating system to provide the functionality described herein for collecting and presenting information.

The insight application 110 is configured to analyze entity-related data 112 received at, stored at, displayed at, and/or sent by the client device 102. The entity-related data 112 can be associated with one or more entities. As used herein, an "entity" may refer to one or more of a person, a company, a product, a group, a team, a business unit, a topic, and/or subject matter. As such, the entity-related data 112 can include data referring to and/or associated with one or more persons, companies, products, groups, teams, business units, topics, subject matter, and/or other entities. According to various embodiments, the entity-related data 112 relates to an electronic mail ("email") message, a real-time message, a telephone communication, a voice-over-Internet-protocol ("VoIP") communication, Internet or other network data such as hypertext-markup-language ("HTML") data, web pages, stand-alone application program data, calendar data, combinations thereof, and the like.

According to various embodiments, the insight application 110 is further configured to extract entity information 114 from the entity-related data 112 or to retrieve the entity information 114 from the application programs 108. The insight application 110 analyzes the entity-related data 112 to search for the entity information 114, or queries the application programs 108 for the entity information 114. The entity information 114 can include explicit information identifying one or more entities associated with the entity-related data 112. According to various implementations, the entity information 114 includes an email address associated with an email message, caller identification ("callerID") information associated with an incoming telephone call, voice recognition data identifying a caller associated with an incoming telephone call, identifying information associated with an electronic communication such as device and/or application identifiers, identifying information of attendees associated with a calendar event, a product associated with a catalog or product identification, a company name associated with an order, and the like. The entity information 114 also can be extracted from the entity-related data 112 using context or search algorithms to identify the entity information 114.

In one exemplary embodiment, the entity-related data 112 is an email message. The insight application 110 searches the email message to identify the entity information 114, which indicates an entity associated with the entity-related data 112. Alternatively, the insight application 110 can receive the entity information 114 from the application programs 108. In the case of an email message, the entity information 114 may include one or more senders of an email message, which may be determined by the insight application 110 based upon one or more email addresses extracted from the email message. The insight application 110 can compare one or more extracted email address to a contacts list to identify the sender of the email message. If the insight application recognizes the sender of the email message, the insight application 110 can use the email address or other identifying information associated with the entity as the entity information 114.

In some instances, the insight application 110 may not be able to identify the entity information 114 based upon explicit data included in the entity-related data 112. In the case of the email message example discussed above, the insight application 110 may not recognize an email address associated with the email message. If the insight application 110 does not recognize explicit data included in the entity-related data 112, the insight application 110 can search the entity-related data 112 for implicit information corresponding to the entity information 114. Again, with reference to the email message example discussed above, the insight application 110 may apply context or search algorithms to the email message to identify an individual or company name, a physical or web address, a telephone number, and the like, any of which may be mentioned in the email message. For example, some email messages include a signature block, a closing line, an embedded letterhead, or other information that may include data that potentially identifies an entity associated with the email messages. Thus, the insight application 110 can recognize the entity information 114 whether explicitly or implicitly included in the entity-related data 112.

In some instances, the insight application 110 may recognize that more than one entity potentially relates to the entity-related data 112. Thus, the insight application 110 can be configured to disambiguate the entity information 114 to identify a single most-relevant entity associated with entity-related data 112, and to thereby determine the entity information 114. As will be explained in more detail below with reference to FIG. 2, the insight application 110 can disambiguate the entity information 114 based upon information such as, but not limited to, contact lists or aliases stored at the client device 102. The insight application 110 also can disambiguate the entity information 114 based upon analysis of data stored or hosted at a location remote from the client device 102. Similarly, one or more devices or applications executed at the client device 102 and/or at another device or node in communication with the client device 102, can disambiguate the entity information 114.

The insight application 110 can be configured to disambiguate the entity information 114 automatically and/or based upon user input. In some embodiments, the insight application 110 generates and displays for a user a list of possible entities associated with the entity information 114. The user may select one of the listed entities or may specify another entity that is not listed. In other embodiments, the insight application 110 can be configured to automatically disambiguate the entity information 114 based upon contextual information included in the entity-related data 112, by comparing multiple possible entities and selecting an entity that appears to be the most relevant entity, and the like. In some embodiments, the entity information 114 can be disambiguated by searching for and identifying correlations between multiple data sources. For example, an email client may be searched for information correlated with information in a data storage location, wherein information existing in both locations indicates a level of relevance. This example is illustrative, and should not be construed as being limiting in any way.

The insight application 110 is configured to transmit the disambiguated entity information 114 to a CRM server 116 operating on or in communication with the network 104. According to various embodiments, the CRM server 116 is a web server that is accessible via the network 104. The CRM server 116 executes a server application 118 for providing the functionality described herein for allowing users or devices connected to the CRM server 116 to access, read, modify, query, store, and/or obtain CRM data 120 stored at, hosted by, and/or accessible to the CRM server 116.

In some embodiments, the CRM server 116 is replaced with and/or supplemented by other relationship management systems such as, for example, real-estate management systems, hospital management systems, and the like. Similarly, the CRM data 120 can be replaced by and/or supplemented by relationship management data. Thus, the illustrated and described examples should be understood as being illustrative of the concepts and technologies disclosed herein, and should not be construed as being limiting in any way.

The CRM data 120 includes information relating to any number of entities. According to exemplary embodiments, the CRM data 120 includes, but is not limited to, contact information, personal information, company information, sales information, customer and sales history and trends, event information, communications records, purchasing history and trends, meeting history, and/or other information. The CRM data 120 can be stored or hosted by the CRM server 116, or can be stored at one or more databases, servers, or other data storage locations associated with or accessible by the CRM server 116. In the illustrated embodiment, the CRM data 120 is illustrated as residing at the CRM server 116. It should be understood that this embodiment is exemplary, and should not be construed as being limiting in any way.

The CRM application 118 is configured to receive the entity information 114 from the client device 102. The CRM application 118 accesses the CRM data 120 to retrieve entity data 122 associated with the entity identified by the entity information 114. The entity data 122 includes, but is not limited to, one or more data records. As such, the phrase "entity data," as used herein, includes any type of data associated with the entity identified by the entity information 114. In some embodiments, the entity data 122 includes specific data relating to the entities, summary data describing the entities, data describing related entities, and other data.

The CRM application 118 transmits the entity data 122 to the client device 102. According to some embodiments, the server application 118 transmits the entity data 122 in response to a query or request received from the client device 102. Thus, the CRM server 116 can function as a query-response device, wherein the entity information 114 received from the client device 102 is treated by the server application 118 as a query for information, and wherein the server application 118 provides the entity data 122 as the response to the query.

Figure 2:
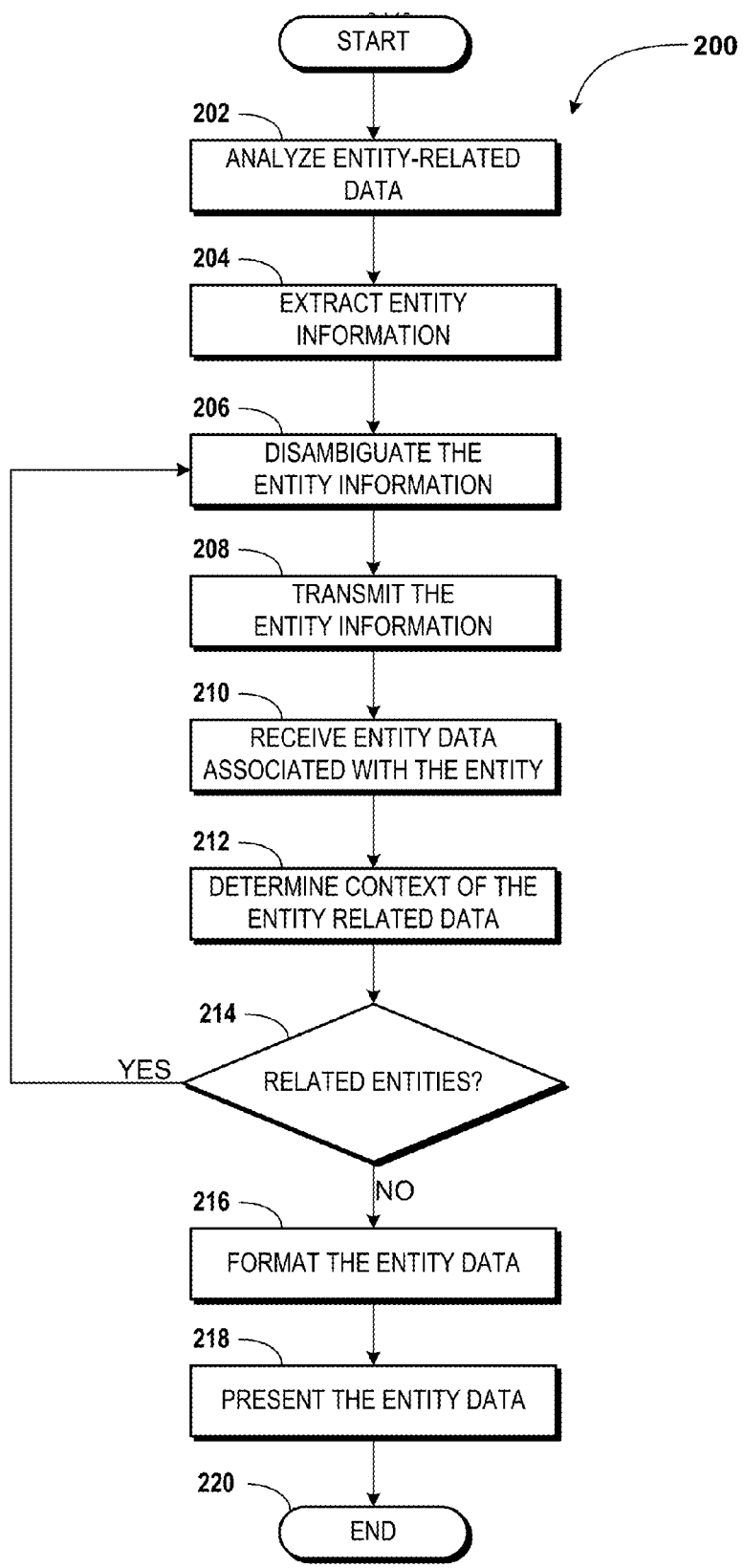
FIG. 2 is a flow diagram showing aspects of a method for collecting and presenting information, according to an exemplary embodiment.
Figure 3A:
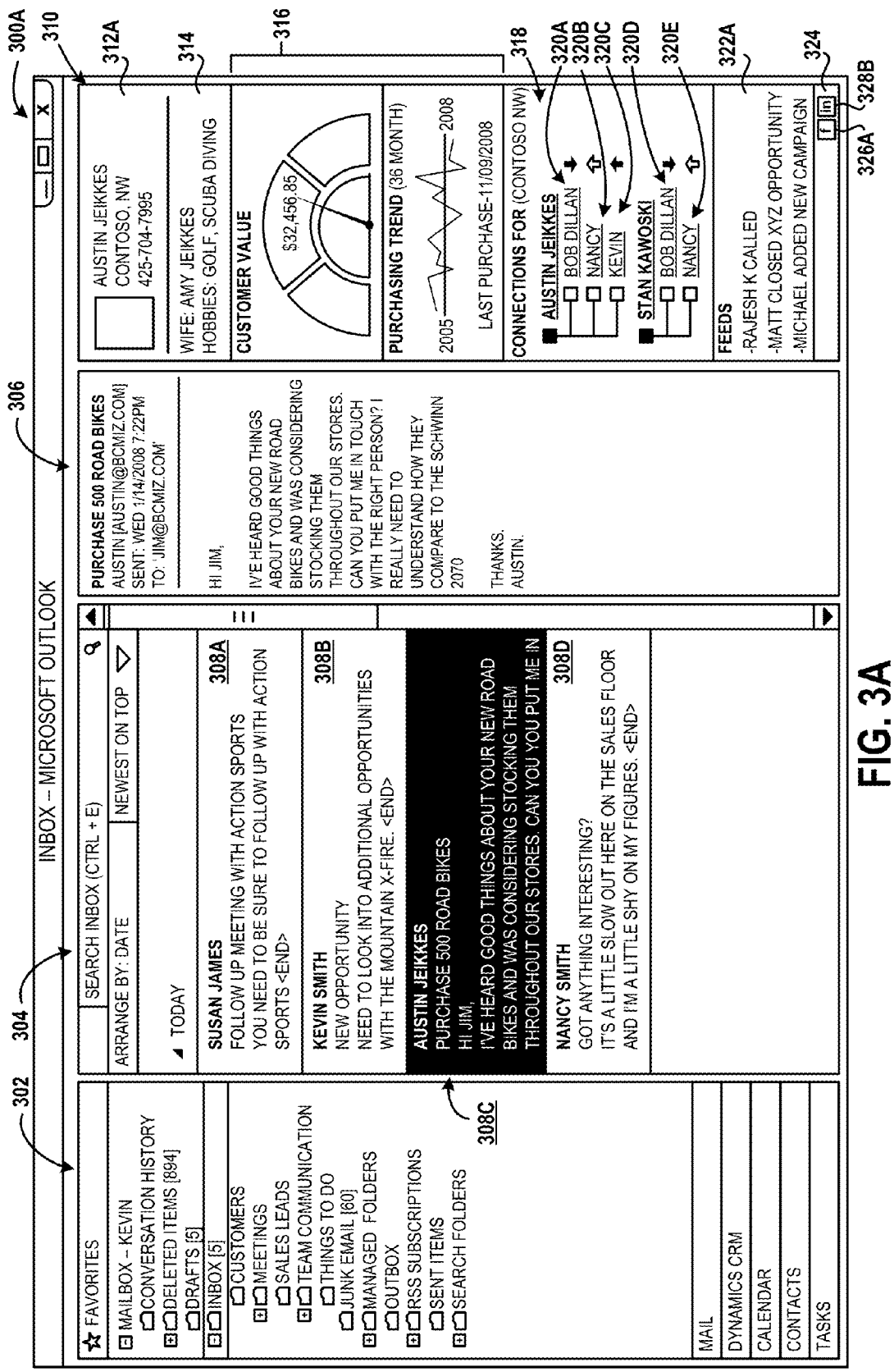
Figure 3B:
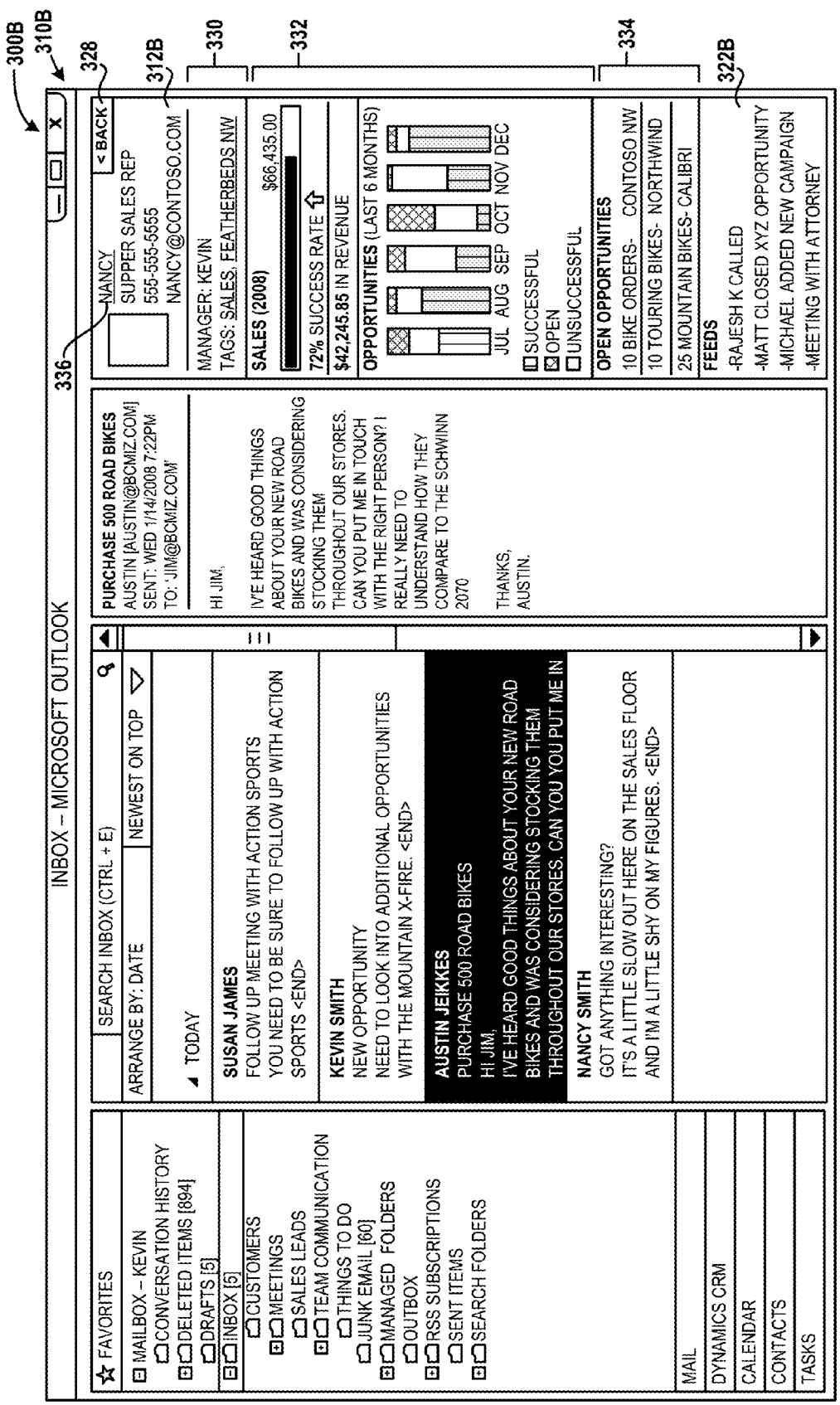
Figure 3C:
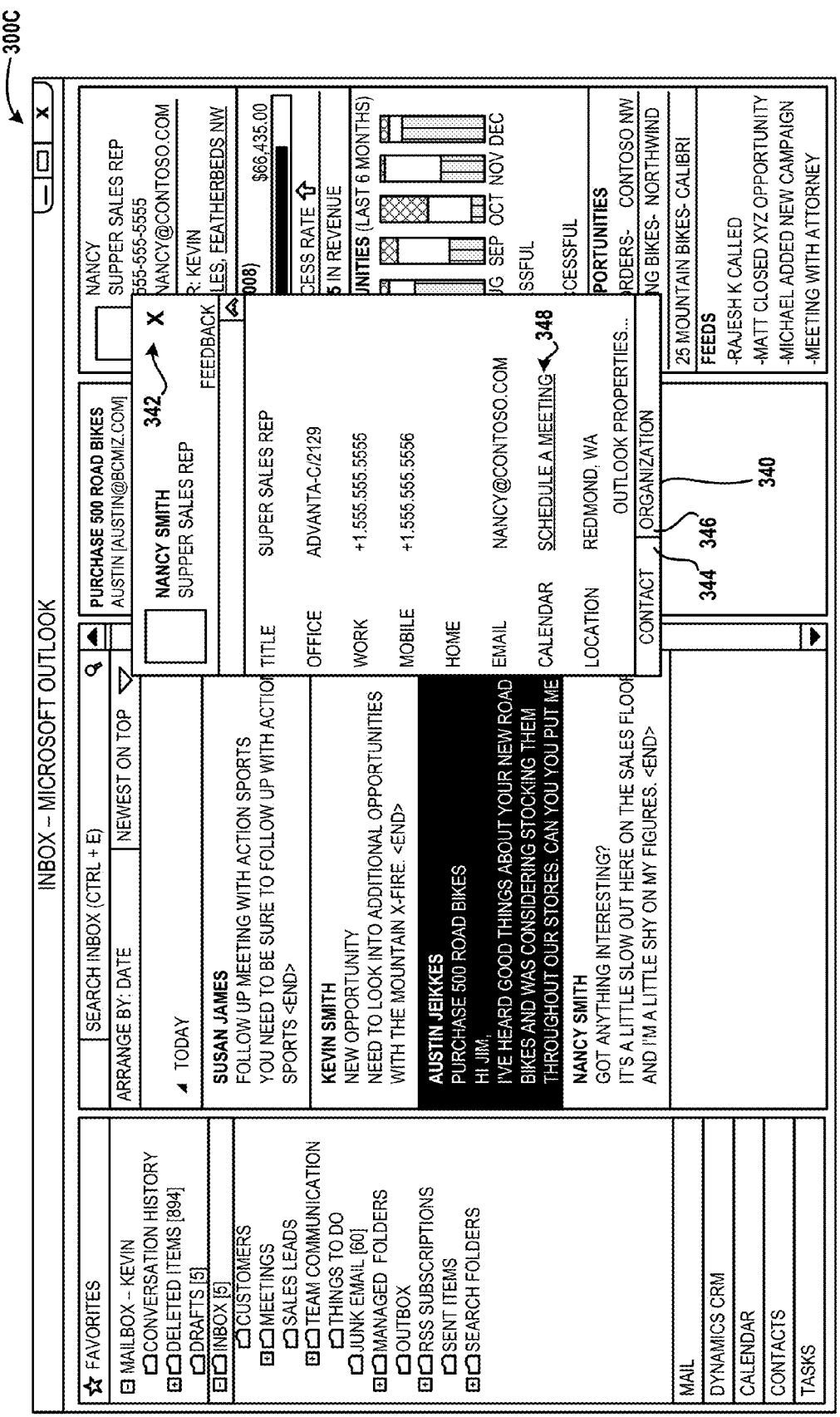
Figure 3D:
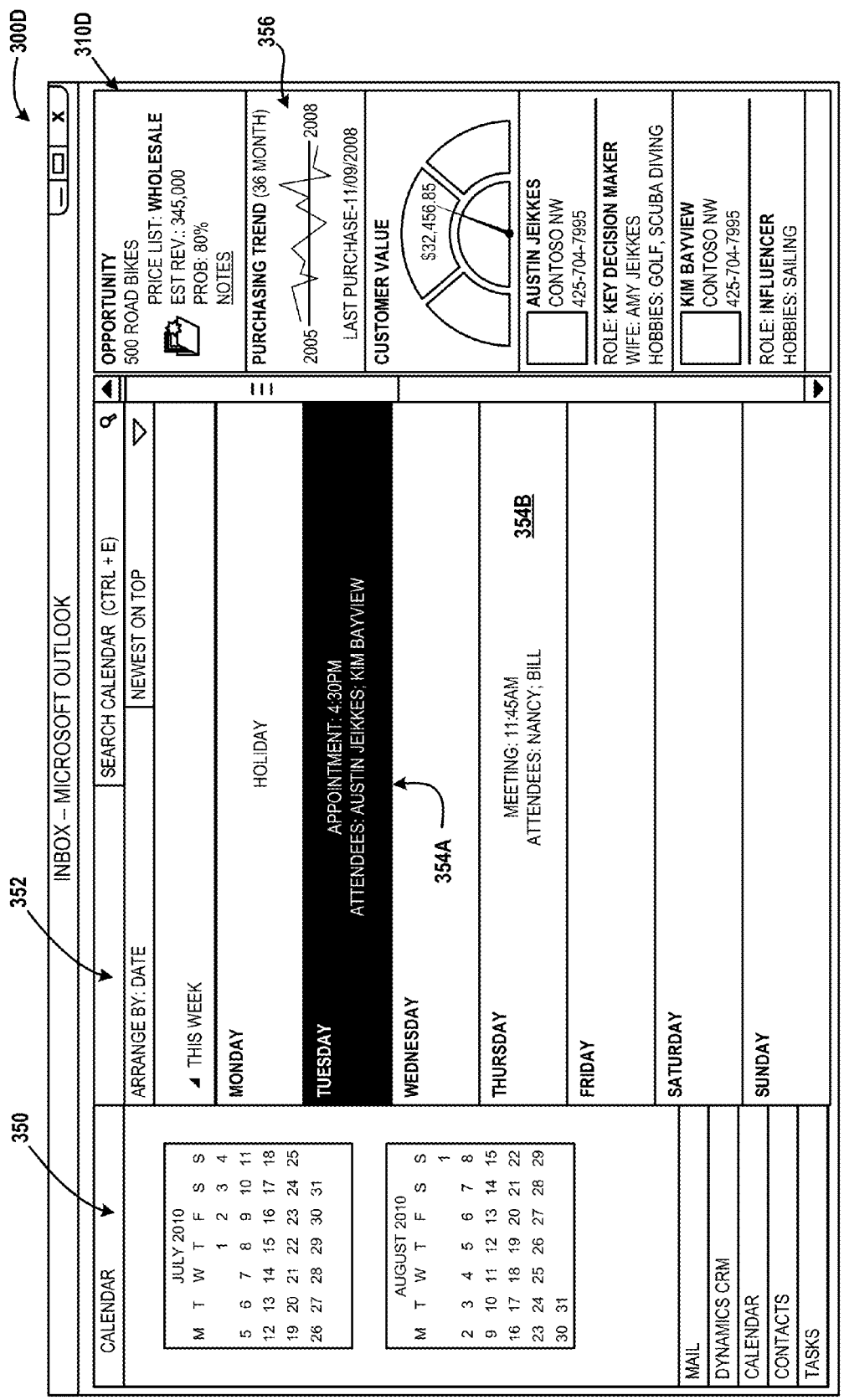
Figure 3E:
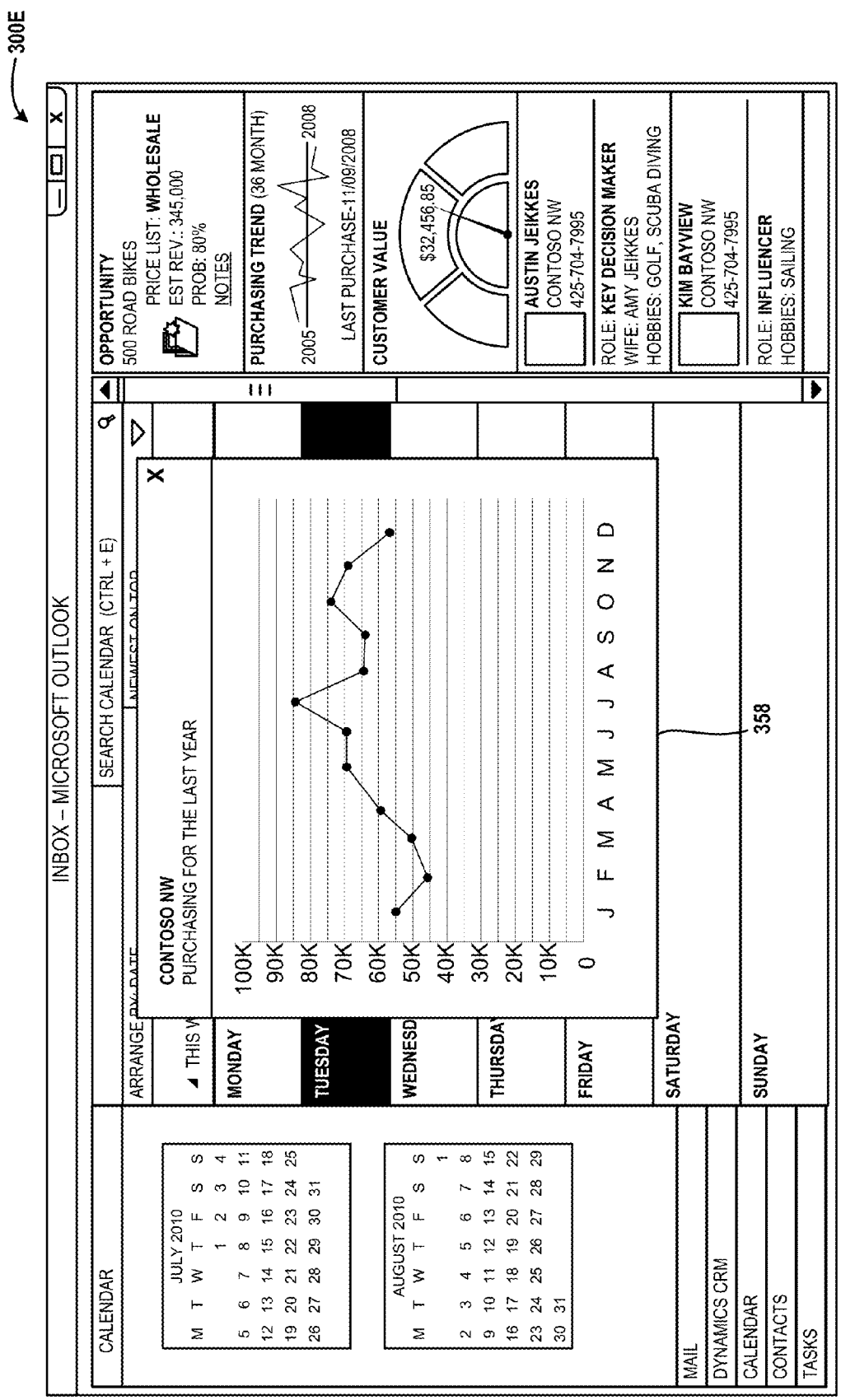
Figure 3F:
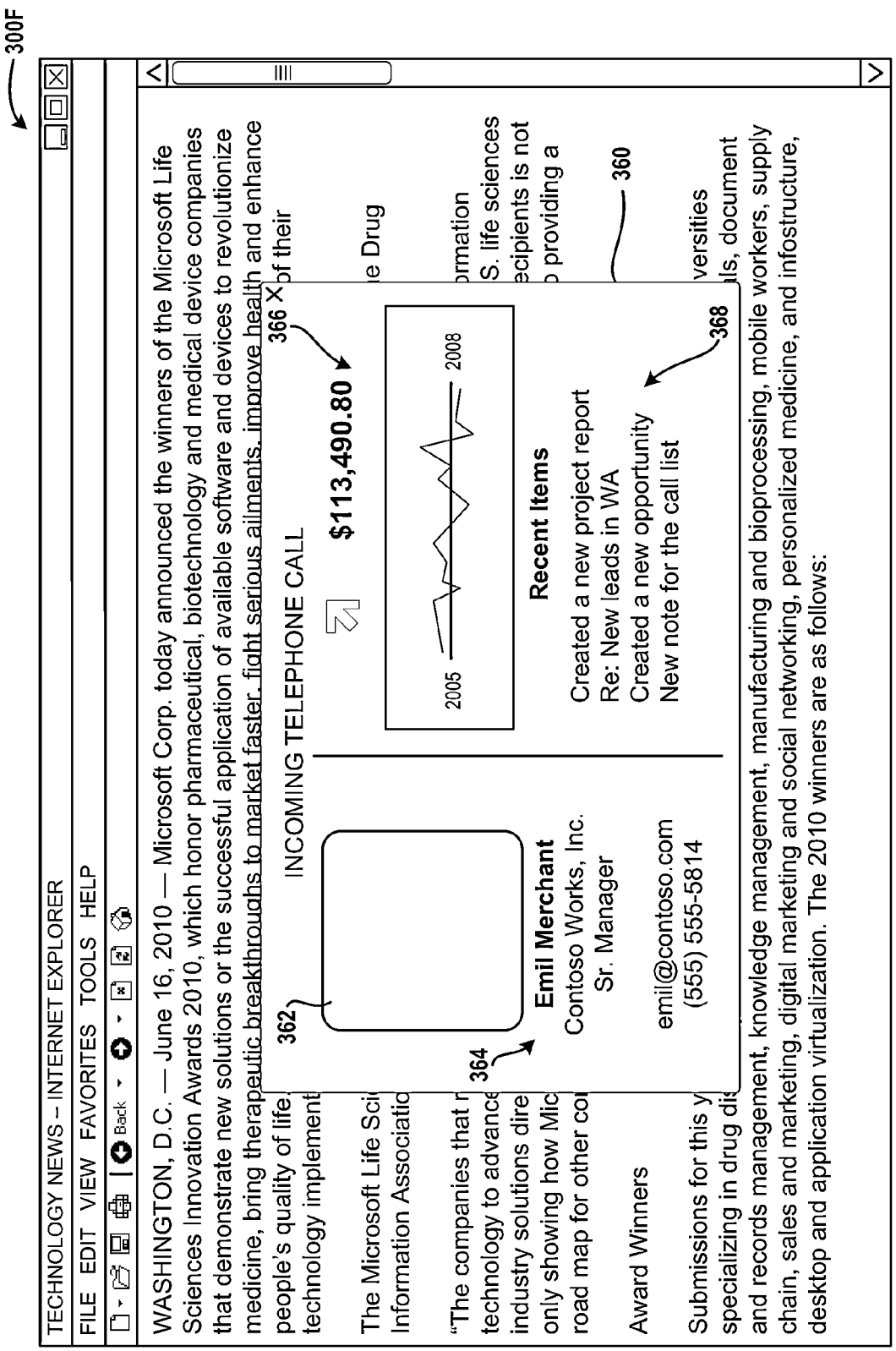
Figure 3G:
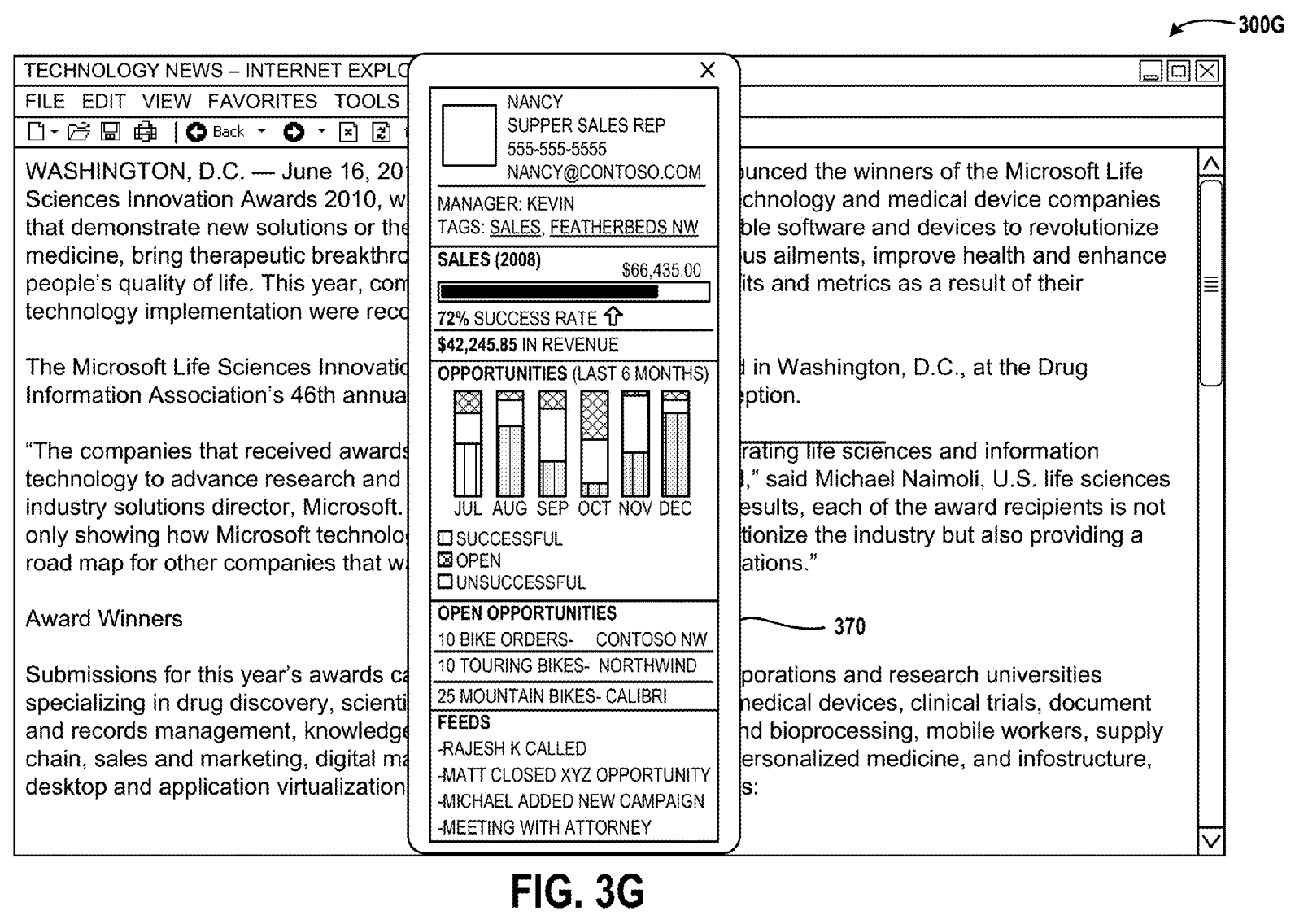
Figure 4:
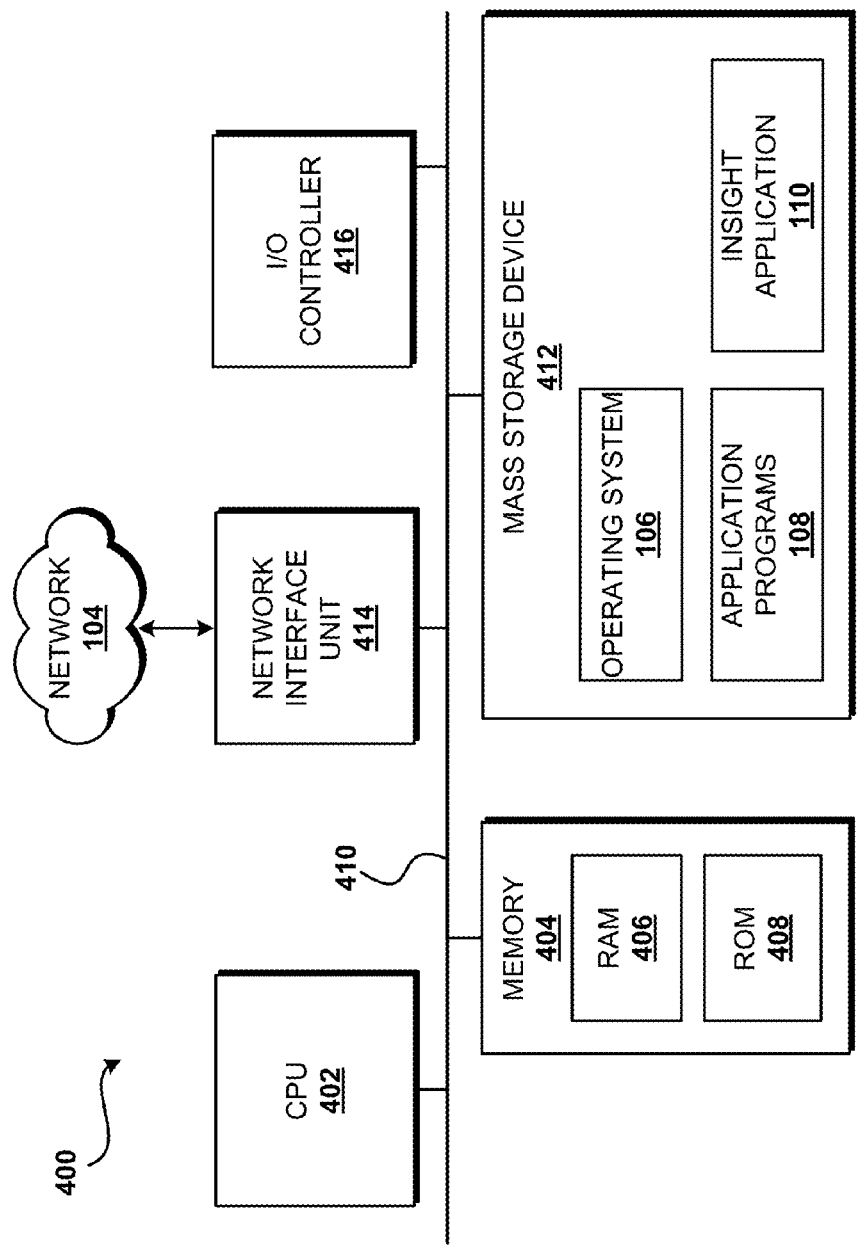
FIG. 4 is a computer architecture diagram illustrating an exemplary computer hardware and software architecture for a computing system capable of implementing aspects of the embodiments presented herein.

As is described herein in more detail with reference to FIGS. 2-4, the insight application 110 receives the entity data 122 from the CRM server 116. The insight application 110 is configured to format the entity data 122 for presentation in accordance with a context of the entity-related data 112. The insight application 110 analyzes the entity-related data 112 to determine the context associated with the entity-related data 112. The insight application 110 can be configured to tailor the format and/or content of the presented data based upon the identified context. For example, the insight application 110 may determine what portion of the entity data 122 may be useful to a user and/or how the information should be presented to the user.

With respect to an email message for example, the insight application 110 may consider sender information associated with the email message, the subject line of the email message, and the body of the email message to identify contextual information associated with the email message. The contextual information identified by the insight application 110 includes, but is not limited to, a company for whom the sender of the email message works, the subject matter of the email message, contact information associated with the sender of the email message, and the like. If an email includes a request, the insight application 110 can determine that the subject matter of the email message is directed to an opportunity associated with the request, and can use that contextual information to retrieve information relative to the identified opportunity for presentation to the user. Thus, relevant information can be provided to the user, and presented to the user in a meaningful way.

Once the context is determined, the insight application 110 retrieves or generates report elements for presentation at the client device 102. As will be explained in more detail herein, the presented data can relate not only to a single entity, such as a sender of an email address, but also to a number of related entities. The entity may be associated with entity data 122, and the entity data 122 can provide information indicating one or more related entities. Entity data 122 relating to the entity and the related entities is received at the client device 102 and formatted for presentation to a user.

More particularly, the insight application 110 is configured to analyze the entity data 122 and the context of the entity-related data 112 to identify one or more entities that are related to the entity associated with entity data 122 and/or that are related to the context of the entity-related data 112. The insight application 110 identifies the related entities, and obtains entity data 122 associated with the related entities from the CRM server 116. The insight application 110 analyzes the entity data 122 associated with the entities and the related entities to format and present the entity data 122 to a user at the client device 102, as mentioned above. For example, if the related-entity data 112 relates to a message including a sales order, the insight application 110 may determine that a sales history for the company associated with the sender of the request, open sales opportunities with the company, salespersons engaged with the sender of the request, or a company for whom the sender works, and the like, are relevant to the request. Thus, the insight application 110 can define these and other entities as related entities for the received request. It should be understood that this example is exemplary, and should not be construed as being limiting in any way.

FIG. 1 illustrates one client device 102, one network 104, and one CRM server 116. It should be understood, however, that some implementations of the operating environment 100 include multiple client devices 102, multiple networks 104, and multiple CRM servers 116. Therefore, the illustrated embodiment should be understood as being exemplary, and should not be construed as being limiting in any way.

Turning now to FIG. 2, aspects of a method 200 for collecting and presenting information will be described in detail, according to an exemplary embodiment. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 is described as being performed by the client device 102 by executing one or more of the application programs 108 and the insight application 110. It should be understood that the illustrated and described embodiments are exemplary, and should not be viewed as being limiting in any way.

The method 200 begins at operation 202, wherein the insight application 110 analyzes the entity-related data 112. The entity-related data 112 can include almost any data sent by, stored at, or received at the client device 102. As will be explained in more detail below with reference to FIGS. 3A-3G, the entity-related data 112 can correspond to any data at the client device 102 including, but not limited to, one or more email messages, communications data, Internet or intranet files, web pages, computer files, voice recognition information that identifies a caller, callerID data, chat and instant messaging ("IM") data, real-time messaging data, social networking data, and/or other data. In some embodiments, the entity-related data 112 includes data identifying one or more parties associated with a real-time communication such as a telephone call, VoIP communications, video conferences, instant messages, and the like.

From operation 202, the method 200 proceeds to operation 204, wherein the insight application 110 extracts the entity information 114 from the entity-related data 112. The insight application 110 is configured to extract the entity information 114 based upon explicit and/or implicit information included in the entity-related data 112. For example, the insight application 110 can extract explicit entity information 114 such as a sender email address from an email message. Similarly, the insight application 110 can extract voice recognition and/or callerID information from a telephone call or VoIP communication, company or contact information from an order form, names or aliases from web pages, and the like.

In some embodiments, the entity-related data 112 corresponds to an entity-based web page or web service such as the FACEBOOK social networking service, the TWITTER real-time messaging service, the LINKEDIN social networking service, and the like. Users or accounts associated with status updates, publications, real-time messages, users, and the like can correspond to one or more entities. Thus, the insight application 110 can be configured to identify the entity information 114 in web pages or other data received from these and other entity-based web pages and web services. In yet other embodiments, a user of the client device 102 can select a name, an email address, a telephone number, a physical address, a uniform resource locator ("URL") address, or other information in an entity-based and/or non-entity-based web page or web service, and the functionality of the insight application 110 described herein can be invoked.

In various embodiments, the insight application 110 extracts implicit entity information 114 from the entity-related data 112 without user input. For example, the insight application 110 can analyze an email message, a letter, a document, a web page, or other file to identify the entity information 114. The entity information 114 can include a name of a person, a company name, a physical or virtual address, a telephone number, an email address, a URL address, and/or other information associated with an entity such as a perceived author of the entity-related data 112. The implicit entity information 114 can be included anywhere in the entity-related data 112 including, but not limited to, a signature block, a letterhead, a closing line, or another portion of the entity-related data 112. The implicit entity information 114 also can be extracted from a certificate, META data, and/or other digital information associated with the entity-related data 112. These examples are exemplary, and should not be construed as being limiting in any way. The insight application 110 can use this implicit entity information 114 to search for one or more entities represented in the CRM data 120.

From operation 204, the method 200 proceeds to operation 206, wherein the insight application 110 disambiguates the identified entity information 114. In some instances, the entity information 114 clearly identifies a single entity and the insight application 110 does not disambiguate the entity information 114. In other instances, the insight application 110 does not clearly identify a single entity. For example, a company name, web address, street address, telephone number, and the like may be associated with one or more entities represented in the CRM data 120. Thus, the insight application 110 can disambiguate the entity information 114 to identify a single entity associated with the entity information 114.

In some embodiments, the insight application 110 accesses the CRM data 120 stored at the CRM server 116 to disambiguate the entity information 114. Although not described in detail herein, it should be understood that the CRM server 116 and/or other devices or nodes can be configured to disambiguate the entity information 114, if desired. The insight application 110 is configured to analyze the CRM data 120 stored at the CRM server 116 to identify the entity with which the entity information 114 is associated. For example, the insight application 110 can examine the CRM data 120 to identify an e-mail address, a telephone number, a street address, a name, a URL address, and the like, associated with the entity information 114.

In some embodiments, the insight application 110 analyzes the CRM data 120 and identifies two or more entities that may be related to the entity information 114. The insight application 110 is further configured to present the two or more entities to a user of the client device 102, and to receive input corresponding to a selection of one of the two or more entities presented to the user of the client device 102, the selection corresponding to the entity that the user 102 or user input identifies as being most relevant to the entity-related data 112. Thus, the insight application 110 can be configured to automatically select the entity associated with the entity information 114, or to present a number of entities to a user of the client device 102 to identify the entity associated with the entity information 114.

It should be understood that the client device 102 can access information stored locally at the client device 102 and/or at a data storage location accessible by the client device 102 to identify the entity associated with the entity information 114, or to perform the disambiguation described above without accessing the CRM server 116. Therefore, it should be understood that the client device 102 does not necessarily access the CRM server 116, and that the disambiguation can be performed locally at the client device 102. Furthermore, it should be understood that the CRM server 116 can be configured to perform the disambiguation. Other embodiments are contemplated and are possible.

As explained above, the entity data 122 can relate to an entity. For example, if the entity-related data 112 is an e-mail message, the insight application 110 can determine the sender of the e-mail message based upon a "reply-to" or "from" address extracted from message headers of the email message. The insight application 110 can use the extracted "reply-to" or "from" address as the entity information 114. The insight application 110 transmits the entity information 114 to the CRM server 116. The CRM server 116 identifies entity data 122 in the CRM data 120 and transmits the entity data 122 back to the client device 102. Therefore, the insight application 110 can obtain entity data 122 corresponding to an entity associated with the entity-related data 112.

From operation 206, the method 200 proceeds to operation 208, wherein the insight application 110 transmits the disambiguated entity information 114 to the CRM server 116 to obtain the CRM data 120. Although not illustrated in FIG. 2, the CRM server 116 and/or the server application 118 are configured to receive the entity information 114, to access the CRM data 120 to identify entity data 122 associated with the entity information 114, and to transmit the identified entity data 122 to the client device 102. The entity data 122 identified and transmitted by the server application 118 can include any or all information corresponding to the entity associated with the entity information 114. From operation 208, the method 200 proceeds to operation 210, wherein the insight application 110 receives the entity data 122 from the CRM server 116.

From operation 210, the method 200 proceeds to operation 212, wherein the insight application 110 identifies a context associated with the entity-related data 112. The insight application 110 is configured to determine the context of the entity-related data 112 based upon explicit and/or implicit information in or associated with the entity-related data 112, and may use the determined context to identify related entities and/or to tailor the format and/or content of data presented to a user of the client device 102.

Some examples of context have been provided above and include, without limitation, subject matter of the entity-related data 112, senders or recipients of the entity-related data 112, files or other data attached to the entity-related data 112, and the like. For example, if an email message specifies a large number of recipients and/or specifies a highly-ranked individual at a company, the insight application 110 can determine that the email message is of high importance. Furthermore, the insight application 110 can determine, based upon natural language parsing and/or search algorithms that the subject matter of the entity-related data 112 is directed to a particular entity or activity. For example, the insight application 110 may determine that language in the entity-related data 112 that includes one or more references to "past orders" refers to historical purchasing information. Thus, the insight application 110 can request the historical purchasing information and display the historical information for the user of the client device 102. These examples are illustrative and should not be construed as being limiting in any way.

From operation 212, the method 200 proceeds to operation 214, wherein the insight application 110 determines if there are any entities related to the one or more entities associated with the entity data 122 ("related entities"). For example, if an entity associated with the entity data 122 is a customer of a company, a related entity could include a salesperson, a contact name, email, or telephone number, a parent company, an attorney, and/or any other related entity associated with the entity. The insight application 110 can be configured to determine and identify these related entities, based upon explicit and/or implicit data included in the entity data 122, the entity-related data 112, and/or other sources.

If the insight application 110 identifies one or more related entities, the method 200 returns to operation 206, wherein the insight application 110 disambiguates entity information 114 corresponding to the related entity. The insight application 110 can repeat the operations 208-214 until entity data 122 associated with all entities and related entities is obtained by the insight application 110. If the insight application 110 determines at operation 214 that there are no related entities associated with the entity data 122, the method 200 proceeds to operation 216.

In operation 216, the insight application 110 formats data in the received entity data 122 for presentation. It will be appreciated that the entity data 122 may relate to a number of entities, including the entity associated with the entity-related data 112 and/or related entities. The insight application 110 formats the entity data 122 according to preferences and/or settings, which can be customized by report and application authors or personalized by one or more users or other authorized entities associated with the insight application 110. It therefore should be understood that the format in which the entity data 122 is presented can be tailored according to almost any considerations, and that the examples provided herein are illustrative.

In some embodiments, the insight application 110 displays entity data 122 as informational data to assist a user of the client device 102 in his or her interactions with and/or research of the entity associated with the entity-related data 112. For example, the insight application 110 can display a photograph and contact information for associated with the entity-related data 112 to provide a user with visual and textual information associated with the entity. The operation 216 therefore can include obtaining and formatting contact and photographic information associated with the entity.

In some embodiments, the insight application 110 provides data from reports including statistics and heuristics for the entities associated with the entity data 122. The operation 216 therefore can include obtaining and/or generating reports corresponding to the statistics and/or heuristics, and formatting the data into a format and/or layout appropriate for the given context of the entity-related data 112 as determined in operation 216. The operation 216 also can include obtaining and formatting aggregated activity information in the form of feed data that represents recent and/or relevant activity associated with the entity or entities corresponding to the entity data 122. Some exemplary formats for displaying the entity data 122 are presented below with reference to FIGS. 3A-3G.

From operation 216, the method 200 proceeds to operation 218, wherein the insight application 110 presents the formatted entity data 122 to a user of the client device 102. As mentioned above, and as will be the illustrated and described in more detail with reference to FIGS. 3A-3G, the formatted entity data 122 can be presented as one or more sidebars, panes, floating windows, text, graphics, video, audio, and/or other formats, as determined by preferences and/or settings associated with the insight application 110. The method 200 ends at operation 220.

According to various implementations, the data presented by the insight application 110 is generated on-demand by the insight application 110 based upon entity data 122, the context of the entity-related data 112, and/or customizations, personalizations, preferences, and/or settings associated with the insight application 110. The insight application 110 also can be configured to generate or obtain some reports during off-peak activity times to avoid overconsumption of network, storage, computing, and/or bandwidth resources. Thus, it should be understood that none, some, or all of the entity data 122 can be generated live, i.e., on-demand, and/or generated during off-peak-activity times and cached for future use.

Cached data can be generated according to a predefined schedule and/or generated when changes are made to the associated data. It should be understood that the caching of the entity data 122 can include generating reports and/or other information, or pre-processing reports and/or other information to reduce the amount of time and/or computational resources needed to generate the reports and/or other information on-demand. These embodiments are exemplary, and should not be construed as being limiting in any way.

Although not illustrated in FIG. 2, it should be understood that the insight application 110 can periodically check for updates to the entity data 122 obtained as described herein. Thus, the insight application 110 can be configured to poll or query the CRM server 116 for changes to the entity data 122 based upon scheduled updates, time intervals, and/or changes being made at the client device 102 and/or the CRM server 116.

Furthermore, it should be understood that the data presented to the user can include various actions in addition to, or instead of, information for review by the user. Thus, the user of the client device 102 can use the presented information and actions to perform additional actions and/or perform additional research regarding the entity data 122. For example, the entity data can include, but is not limited to, contact information. The presented data therefore can include not only the contact information, but also actions based upon the contact information such as, for example, creating calendar events, sending messages, adding activities, editing contact information, and the like. These and other features of the insight application 110 are described in more detail below with reference to FIGS. 3A-3G.

Turning now to FIG. 3A, a user interface diagram showing aspects of a user interface ("UI") for presenting information to a user of a client device 102 in one embodiment will be described. In particular, FIG. 3A shows a screen display 300A generated by one or more application programs 108 and the insight application 110 according to one particular implementation presented herein. In the illustrated implementation, the application programs 108 include an email application. It should be appreciated that the UI diagram illustrated in FIG. 3A is exemplary.

The screen display 300A shown in FIG. 3A includes various tool bar and menu items. It should be understood that the illustrated tool bar and menu items are merely illustrative, and that additional and/or alternative tool bar and/or menu items are possible and are contemplated. In the illustrated embodiment, the screen display 300A includes a mail folder list 302, a mail folder contents pane 304, and an email message reading pane 306. As illustrated, the mail folder contents pane 304 shows four email messages 308A-D. The email message 308C is illustrated as selected, and the contents of the email message 308C are currently displayed in the email reading pane 306. The screen display 300A also includes an insight pane 310A. According to various embodiments, the insight application 110 generates the insight pane 310A, as explained above with reference to FIG. 2.

The insight pane 310A includes a visual representation of entity data 122, and can present useful information to a user of the application programs 108. In the illustrated embodiment, the insight pane 310A includes a contact information area 312A for displaying contact information of a sender of the selected email message 308C. The insight pane 310 also includes personal information 314 associated with the entity, which may be useful to a user of the client device 102 during correspondence or communication with or research of the entity. Although not visible in the illustrated embodiments, it should be understood that all of the presented information can be configured as UI controls, the selection of which cause the insight application 110 to provide additional or more-detailed data regarding the associated presented information.

According to various embodiments, the insight pane 310A includes value and purchasing trend data 316. As mentioned above, the contents of the insight pane 310A are determined and formatted based upon user and/or administrator preferences, context of the entity-related data 112, and/or other considerations. Thus, it should be understood that the value and purchasing trend data 316 is exemplary, and can be substituted for by other information that is relevant to the determined context of the entity-related data 112, if desired.

In the illustrated embodiment, the sender of the selected email message 308C is a customer of the user of the email messaging program. In this case, the user has configured the insight application 110 to provide the illustrated value and purchasing trend data 316 to allow the user to ascertain, at a glance, the perceived value of the sender of the selected email message 308C. It should be understood that this embodiment is exemplary, and that the contents and format of the insight pane 310A can be customized, personalized, and/or otherwise determined by a user, administrator, or authorized entity associated with the insight application 110.

The insight pane 310A also includes a connections area 318 for displaying related entities associated with the entity. In the illustrated embodiment, the connections area 318 includes five connections 320A-E. The connections 320A-C are associated with the entity, a sender of the selected email message 308C. The connections 320D-E are associated with a related entity, a company for which the sender of the selected email message 308C works. Thus, the connections area 318 includes connections 320A-E corresponding not only to the sender of the selected email message 308C, but also corresponding to another person who works at the company associated with the sender of the selected email message 308C.

It should be understood that the connections 320A-E are not necessarily limited to people within an organization associated with the sender of the selected email message 308C. The connections area 318 also can include connections 320A-E within other organizations. Furthermore, the connections 320A-E are not necessarily limited to people. Other connections can include data streams, RSS feeds, news sources, ordering systems, and/or any other entities, if desired. As such, the illustrated embodiment should be understood as exemplary, and should not be construed as being limiting in any way.

As mentioned above, each item displayed on the screen display 300A can operate as a UI control, the selection of which causes the insight application 110 to provide more detailed information relating thereto. Thus, it should be understood that the connections 320A-E can operate as UI controls, the selection of which cause the insight application 110 to provide more detailed information relating to the entities associated with the connections 320A-E. An exemplary embodiment for displaying additional information relating to one of the connections 320A-E is illustrated and described with reference to FIG. 3B below. It should be understood that the illustrated connections area 318 and the contents thereof are exemplary and should not be construed as being limiting in any way.

The insight pane 310A also includes a feeds area 322A, which includes a list of recent activity associated with an entity, in this case, the sender of the selected email message 308C. The feeds area 322A can be populated with activity compiled by the insight application 110. For example, the insight application 110 can access a calendar associated with the user to identify appointments, activities, meetings, and the like, with the sender of the selected email message 308C. Additionally, the feeds area 322A can display information indicating calls associated with the entity, chat or instant messaging information associated with the entity, business opportunities or activities associated with the entity, and the like.

Although not illustrated herein, it should be understood that in some embodiments, the insight application 110 provides an interface for tracking all activities and communications occurring at the client device 102. Thus, for example, chatting, instant messaging, VoIP or telephone communications, and the like, can be tracked by the insight application 110, and presented in the feeds area 322A. It should be understood that the illustrated feeds area 322A and the contents thereof are exemplary and should not be construed as being limiting in any way.

The insight pane 310A also includes icons 326A-B associated with additional information corresponding to the entity. In the illustrated embodiment, the icons 326A-B include information compiled from one or more websites or services, which may or may not be stored at the CRM server 116. The icons 326A-B can, but do not necessarily, correspond to entity-based web sites or web services such as social networking services, instant messaging services, real-time messaging services, and the like.

In the illustrated embodiment, the icons 326A-B are associated, respectively, with the FACEBOOK social networking service and the LINKEDIN social networking service. It should be understood that these embodiments are exemplary, and should not be construed as being limiting in any way. Although not illustrated in FIG. 3A, the icons 326A-B can provide additional functionality in response to clicks, hovers, and/or other actions taken with respect to the icons 326A-B. For example, if a user of the client device 102 hovers a mouse pointer over the icons 326A-B, a callout, a floating window, a new window, a new pane, and/or other representations can be displayed for the user of the client device 102.

Turning now to FIG. 3B, a user interface diagram showing aspects of a UI for presenting information to a user of a client device 102 in another embodiment will be described. In particular, FIG. 3B shows a screen display 300B generated by the application programs 108 and the insight application 110 according to another implementation. In this implementation, the mail folder list 302, folder contents pane 304, mail reading pane 306, and an insight pane 310B are displayed. As mentioned above, the insight pane 310B may be displayed in response to a user of the insight application 110 selecting one of the UI controls 320B, 320E, though this is not necessarily the case.

The insight pane 310B includes a UI control 328 for navigating back through previously displayed insight panes 310. In the illustrated embodiment, selection of the UI control 328 causes the insight application 110 to display the previously displayed insight pane 310A. It should be understood that the illustrated UI control 328 is exemplary, and that other embodiments of navigation UI controls are contemplated and are possible. Contemplated embodiments include tabbed browsing capabilities, "breadcrumb" trails, and other approaches for providing the functionality described herein for navigating through the presented data.

The insight pane 310B also includes a contact information area 312B for displaying contact information of an entity. The insight pane 310B also includes related entity information 330 for a related entity associated with the entity information 312B. In the illustrated embodiment, the insight pane 310B is associated with an entity, a salesperson named Nancy. The related entity information 330 displays information for a related entity, a manager of the salesperson Nancy. The related entity information 330 also displays other related entities, a number of products and functions associated with the salesperson Nancy. These examples are illustrative, and should not be construed as being limiting in any way.

According to various embodiments, the layout, content, and other presentation characteristics of the insight pane 310B can vary based upon the type of entity associated with the insight pane 310B. For example, the entity type can drive the presentation of the insight pane 310B, as well as the content thereof, based upon whether the entity associated with the insight pane 310B is a salesperson, a customer, a manager, an executive, and/or another type of entity. For example, the insight pane 310A illustrated in FIG. 3A represents an insight pane 310A associated with a customer, while the insight pane 310B illustrated in FIG. 3B represents an insight pane 310B associated with an employee. Again, these embodiments are exemplary, and should not be construed as being limiting in any way.

The insight pane 310B also includes an entity business statistics area 332 for displaying graphs, heuristics, report data, statistics, or other information associated with the entity. The illustrated embodiment of the entity business statistics area 332 includes a graph illustrating sales associated with the entity, measured over a previous year, a sales opportunity success rate associated with the entity, an amount of revenue generated by the entity over the year, a graph illustrating a number of opportunities handled by the entity, as well as a graph illustrating the number of successful and unsuccessful attempts to close opportunities associated with the entity.

The insight pane 310B also includes an open opportunities area 334. The open opportunities area 334 includes a number of sales opportunities that are open, i.e., opportunities that have not yet been closed by the entity associated with the insight pane 310B. The insight pane 310B also includes a feeds area 322B. The feeds area 322B displays activities and/or other information associated with the entity displayed in the insight pane 310B. The insight pane 310B also includes a UI control 336, the selection of which presents a UI for editing contact information and/or other information associated with the entity, as illustrated and described below with reference to FIG. 3C. As mentioned above, it must be understood that the illustrated embodiment of the insight pane 310B is exemplary, and other reports, illustrations, graphics, data, UI controls, links, and the like can be displayed in the insight pane 310B.

Turning now to FIG. 3C, a user interface diagram showing aspects of a UI for real-time editing of contact information associated with an entity or a related entity will be described. In particular, FIG. 3C shows a screen display 300C generated by the application programs 108 and the insight application 110 according to another implementation. In this implementation, a floating window 340 is displayed.

The floating window 340 includes an interface for allowing a user of the client device 102 to edit contact, calendar, and/or other information associated with the entity and the related entities. In the illustrated embodiment, the floating window 340 includes a UI control 342 for closing the floating window 340. The floating window 340 is illustrated as displaying information for the salesperson Nancy, as a UI control 344 for displaying contact information for a contact has been selected either by input or by default. The floating window 340 also includes a UI control 346 for selecting a related entity such as a company or organization.

In some embodiments, the floating window 340 is displayed in response to a user selecting a UI control displayed in one or more of the insight panes 310A, 310B, though this is not necessarily the case. In the illustrated embodiment, for example, a user of the client device 102 clicked on the UI control 320B or 320E illustrated in FIG. 3A to display the insight pane 310B illustrated in FIG. 3B. The user also selected the UI control 336 displayed in the insight pane 310B to cause the insight application 110 to display the floating window 340.

The floating window 340 includes contact information for the salesperson Nancy. The floating window 340 supports in-place editing of the contact information for the salesperson Nancy or a related entity, a company for which Nancy works. In some embodiments, each line of the contact information corresponds to UI control, the selection of which causes the insight application 110 to present a user interface for editing the information associated with that line of contact information. The floating window 340 also includes a UI control 348 for creating a calendar appointment with the entity. It should be understood that the floating window 340 illustrated in FIG. 3C is exemplary, and should not be construed as being limiting in any way.

Turning now to FIG. 3D, a user interface diagram showing aspects of a UI for presenting information in another embodiment will be described. In particular, FIG. 3D shows a screen display 300D generated by the application programs 108 and the insight application 110 according to another implementation. In this implementation, the application programs 108 include a calendaring application.

The screen display 300D displays a calendar pane 350, a workweek display 352, and the insight pane 310D. The workweek display 352 includes a number of appointments 354A-B. In the illustrated embodiment, the insight pane 310D displays entity data 122 associated with the appointment 354A. As shown in FIG. 3D, the appointment 354A includes two attendees, and information associated with the two attendees is displayed in the insight pane 310.

As mentioned above, and as illustrated in FIG. 3D, the insight pane 310D includes a UI control 356 for displaying a detailed purchasing trend graph corresponding to one or more entities associated with the insight pane 310D. As shown in FIG. 3D, the UI control 356 includes a representation of a purchasing trend. Thus, the UI control 356 illustrates how the information provided by the insight pane 310D, as well as other insight panes 310 illustrated and described herein, also can function as a UI control for providing additional functionality.

FIG. 3D also illustrates that the insight pane 310D can relate to more than one entity. As shown in the screen display 300D, the two attendees shown in the selected appointment 354A are displayed in the insight pane 310D with additional information regarding the attendees. It should be appreciated from the description herein that the insight pane 310D can include various types of information and/or UI controls relating to the attendees of the selected appointment 354A, and that additional information relating to the attendees can be accessed by selecting a UI control associated with the attendees.

In the illustrated embodiment, each of the two attendees is displayed in the insight pane 310D, with their respective roles in the decision making process. Such information can be valuable during a meeting with the attendees in that one of the attendees may have more influence on a purchasing decision, for example, than another of the two attendees. The above examples are illustrative, and should not be construed as being limiting in any way.

Turning now to FIG. 3E, a user interface diagram showing aspects of a UI for presenting information in another embodiment will be described. In particular, FIG. 3E shows a screen display 300E generated by the application programs 108 and the insight application 110 according to another implementation. In this implementation, the application programs 108 include the calendaring application. In the illustrated embodiment, the calendaring application display discussed above with reference to FIG. 3D is displayed with a floating window 358 generated by the insight application 110.

The floating window 358 can be displayed in response to selection of the UI control 356 described above with reference to FIG. 3D, though this is not necessarily the case. The floating window 358 includes a graph illustrating a detailed view of the business statistics and data relating to the UI control 356. It should be understood that this embodiment is exemplary, and should not be construed as being limiting in any way.

Turning now to FIG. 3F, a user interface diagram showing aspects of a UI for presenting information in another embodiment will be described. In particular, FIG. 3F shows a screen display 300F generated the application programs 108 and the insight application 110 according to another implementation. In this implementation, the application programs 108 include a Web browser application. In the illustrated embodiment, the Web browser application is displaying a web page, and the insight application 110 is displaying a floating window 360.

The floating window 360 is displayed in response to the client device receiving the entity-related data 112. In the illustrated embodiment, the entity-related data 112 is a telephone call, though other embodiments of incoming communications include, but are not limited to, real-time messages, IM, chat requests, VoIP communications, and the like. The floating window 360 includes a picture 362 of an entity associated with the entity-related data 112, contact information 364 associated with the entity, business statistics and trend information 366 associated with the entity, and recent items 368 associated with the entity.

The floating window 360 can provide a user of the client device 102 with useful information as the entity-related data 112 is received at a device 102. Therefore, when a user of the client device 102 picks up the telephone to speak to the caller associated with the floating window 360, the user already can know who is calling, his or her title, his or her company, a purchasing trend associated with the caller, and recent activity associated with the entity, all of which can be used by the user during interactions with the entity to improve the customer experience for the caller.

Turning now to FIG. 3G, a user interface diagram showing aspects of a UI for presenting information in another embodiment will be described. In particular, FIG. 3G shows a screen display 300G generated by one or more of the application programs 108 and the insight application 110 according to another implementation. In this implementation, the application programs 108 are displaying a web page, and the insight application 110 is displaying a floating window 370. In the illustrated embodiment, the floating window 370 is substantially similar to the insight pane 310B illustrated in FIG. 3B.

Although not visible in FIG. 3G, it should be understood that the floating window 370 can be automatically generated by the insight application 110 in response to Nancy being mentioned on the web page. In this embodiment, the web page corresponds to the entity-related data 112, and Nancy's name corresponds to the entity information 114. It should be understood that this embodiment is exemplary, and that a user at the client device 102 could select Nancy's name and invoke the functionality of the insight application 110 by entering a command, a keystroke, or the like.

It should be appreciated that the format, orientation, and content of the floating window 370 is exemplary, and should not be construed as being limiting in any way. In particular, the content of the floating window can be provided in a specific format for each specific web page. Thus, the contents and format of the floating window 370 can display the entity data 322 optimized for a particular web page or web service. According to some implementations, the functionality of the insight application 110 is used primarily with entity-based web pages or web services such as social networking sites, real-time messaging services, and the like. In other implementations, the insight application 110 is used with non-entity-based web pages or web services. Therefore, the illustrated embodiment should be understood as exemplary, and should not be construed as being limiting in any way.

FIG. 4 illustrates an exemplary computer architecture 400 for a device capable of executing the software components described herein for collecting and presenting information. Thus, the computer architecture 400 illustrated in FIG. 4 illustrates an architecture for a server computer, mobile phone, a PDA, a smart phone, a server computer, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106, the application programs 108, and the insight application 110.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media that can be accessed by the computer architecture 400.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of this specification and the claims, the phrase "computer-readable storage medium" and variations thereof, does not include waves, signals, and/or other transitory and/or intangible communication media.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems, for example, the client device 102. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for collecting and displaying information have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method, comprising:
automatically extracting from entity-related data, entity information including implicit data identifying an entity;
transmitting the entity information to a server;
receiving additional entity data associated with the identified entity;
determining a context associated with the entity-related data;
formatting the additional entity data based, at least partially, upon the determined context; and
communicating for display the additional entity data including
a trend associated with the identified entity,
a recent activity associated with the identified entity, and
a purchasing activity associated with the identified entity.

2. The method of claim 1, further comprising:
disambiguating the entity information to identify a single most-relevant entity associated with the entity-related data, wherein disambiguating the entity information comprises accessing contact information and identifying the single most-relevant entity in the contact information based, upon the entity information;
obtaining historical purchasing information of the single most-relevant entity, if the context associated with the entity-related data refers to historical information; and
wherein communicating for display the additional entity data associated with the identified entity includes the historical purchasing information.

3. The method of claim 2, wherein the contact information is stored at the server, and wherein identifying the single most-relevant entity comprises presenting a plurality of entities at the client device and receiving input comprising a selection of the most relevant entity by a user associated with the client device.

4. The method of claim 1, wherein the entity-related data comprises a real-time communication occurring via the client device, and wherein the entity information comprises data identifying an entity associated with the real-time communication.

5. The method of claim 1, wherein the entity-related data comprises an electronic message, and wherein the entity information comprises a "reply-to" address or a "from" address associated with a sender of the electronic message.

6. The method of claim 1, wherein displaying the entity data further comprises displaying contact information associated with the identified entity.

7. A computer, comprising:
a processor; and
a computer-readable storage device in communication with the processor, the computer-readable storage device having computer-executable instructions stored thereupon which, when executed by the processor, cause the computer to
automatically analyze the entity-related data to extract entity information including implicit data identifying an entity;
transmit the entity information to a server;
receive additional entity data, the additional entity data associated with the identified entity;
determine a context associated with the entity-related data;
format the entity data based, at least partially, upon the determined context; and
communicate for display the additional entity data associated with the identified entity on a user interface, the additional entity data including
a trend associated with the identified entity,
a recent activity associated with the identified entity, and
a purchasing activity associated with the identified entity.

8. The computer of claim 7, wherein the computer-readable storage device has further computer-executable instructions stored thereupon, which cause the computer to:
disambiguate the entity information to identify a single most-relevant entity associated with the entity-related data, wherein disambiguating the entity information comprises accessing contact information and identifying the single most-relevant entity in the contact information based, at least partially, upon the entity information; and
obtain historical purchasing information associated with the single most-relevant entity, wherein communicate for display the additional entity data associated with the identified entity includes communicate for display the historical purchasing information.

9. The computer of claim 8, wherein the contact information is stored at the server, and wherein identifying the single most-relevant entity comprises presenting a plurality of entities and receiving input comprising a selection of the single most-relevant entity.

10. The computer of claim 7, wherein the entity-related data comprises a real-time communication occurring via the computer, and wherein the entity information comprises data identifying an entity associated with the real-time communication.

11. A computer-implemented method, wherein the computer-implemented method comprises:
automatically analyzing entity-related data to extract entity information including implicit data identifying an entity;
obtaining additional entity data corresponding to the identified entity, wherein the additional entity data is obtained from a database in response to a query containing the entity information, wherein the additional entity data comprises at least one of a trend associated with the identified entity, a recent activity associated with the identified entity, a purchasing activity associated with the identified entity, communications records associated with the identified entity, and a meeting history associated with the identified entity;

determining a context associated with the entity-related data;

selecting for display at least one of
- a trend associated with the identified entity,
- a recent activity associated with the identified entity,
- a purchasing activity associated with the identified entity, communications records associated with the identified entity, and
- a meeting history associated with the identified entity, wherein the selection is based, at least in part, on the determined context; and instructing a device to display the additional entity data based on the selection.

12. A computer-implemented method of claim 11, wherein the automatically analyzing entity-related data comprises: identifying the entity information indicating the identity of the identified entity from a web page, determining the context associated with the entity-related data comprises determining a subject matter of the web page by applying a natural language parsing process or a search to the web page, and the context associated with the entity-related data is based on the subject matter.

13. A computer-implemented method of claim 11, wherein the entity-related data comprises an electronic message, and wherein determining the context associated with the entity-related data comprises determining a level of importance based, at least in part, on a ranking of an individual indicated in the message, and wherein the context associated with the entity-related data is based on the level of importance.

14. A computer-implemented method of claim 11, wherein the computer-implemented method further comprises:
determining when the entity information does not identify a single entity; and
when the entity information does not identify a single entity, disambiguating the entity information to identify a single entity, wherein obtaining the additional entity data includes additional entity data associated with the single entity.

15. A computer-implemented method of claim 14, wherein disambiguating the entity information to identify the single entity, comprises:
displaying an indication of two or more entities on a user interface, wherein at least one of the two or more entities includes the single entity; and
receiving a selection of the single entity.

16. A computer-implemented method of claim 11, wherein the recent activity associated with the identified entity comprises an appointment associated with the identified entity, and wherein the display of the additional entity data comprises the appointment.

17. A computer-implemented method of claim 11, wherein determining the context associated with the entity-related data comprises identifying open opportunities associated with the identified entity, and wherein the display of the additional entity data comprises the open opportunities associated with the identified entity.

18. A computer-implemented method of claim 11, wherein the automatically analyzing the entity-related data comprises identifying the identified entity as an attendee of an appointment, and wherein determining the context associated with the entity-related data comprises:
receiving a selection of a user interface control associated with the appointment; and
obtaining additional entity data corresponding to the attendee of the appointment in response to receiving the selection of the user interface control, and wherein the context associated with the entity-related data is based on the additional entity data corresponding to the attendee.

19. The method of claim 1, wherein the implicit data includes at least one of a name of a person, a company name, a physical address, a virtual address, a telephone number, an email address, a URL address, a signature block, letterhead, a closing line, certificate data and meta data.

20. The computer of claim 7, wherein the implicit data includes at least one of a name of a person, a company name, a physical address, a virtual address, a telephone number, an email address, a URL address, a signature block, letterhead, a closing line, certificate data and meta data.

* * * * *